United States Patent
Cho et al.

(10) Patent No.: US 10,168,934 B2
(45) Date of Patent: Jan. 1, 2019

(54) METHOD AND DEVICE FOR MONITORING DATA INTEGRITY IN SHARED MEMORY ENVIRONMENT

(71) Applicants: Samsung Electronics Co., Ltd., Suwon-si, Gyeonggi-do (KR); SEOUL NATIONAL UNIVERSITY R&DB FOUNDATION, Seoul (KR)

(72) Inventors: Hansu Cho, Hwaseong-si (KR); Brent ByungHoon Kang, Fairfax, VA (US); Yunheung Paek, Seoul (KR); Seungwook Lee, Seoul (KR); Junbum Shin, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 14/911,932

(22) PCT Filed: Aug. 14, 2014

(86) PCT No.: PCT/KR2014/007574
§ 371 (c)(1),
(2) Date: Feb. 12, 2016

(87) PCT Pub. No.: WO2015/023144
PCT Pub. Date: Feb. 19, 2015

(65) Prior Publication Data
US 2016/0196083 A1 Jul. 7, 2016

(30) Foreign Application Priority Data
Aug. 16, 2013 (KR) .................. 10-2013-0097242

(51) Int. Cl.
*G06F 3/06* (2006.01)
*G06F 12/00* (2006.01)
(Continued)

(52) U.S. Cl.
CPC .......... *G06F 3/0622* (2013.01); *G06F 3/0619* (2013.01); *G06F 3/0637* (2013.01);
(Continued)

(58) Field of Classification Search
CPC ...... G06F 12/00; G06F 3/0622; G06F 3/0637; G06F 3/0619; G06F 3/0659
(Continued)

(56) References Cited

U.S. PATENT DOCUMENTS

| 5,623,633 A | 4/1997 | Zeller et al. |
| 5,867,655 A * | 2/1999 | DeRoo ................ G06F 9/30101 709/213 |

(Continued)

FOREIGN PATENT DOCUMENTS

| EP | 1 632 829 A1 | 3/2006 |
| KR | 10-2008-0100674 A | 11/2008 |

OTHER PUBLICATIONS

Moon et al., Vigilare: Toward Snoop-based Kernel Integrity Monitor, Oct. 16-18, 2012, pp. 1-10, Raleigh, North Carolina, USA.

*Primary Examiner* — Tuan V Thai
(74) *Attorney, Agent, or Firm* — Jefferson IP Law, LLP

(57) ABSTRACT

Provided is a method of memory access for a memory controller in an integrity monitoring system sharing memory with a host system. The memory access method may include: receiving a memory access command from a local processor of the integrity monitoring system; accessing a system memory of the host system according to the memory access command; receiving data corresponding to the memory access command from the host system; and for- (Continued)

warding the received data to the local processor, wherein the system memory includes a secure area, access to which is allowed when the memory controller receives a memory access command from the local processor. In a feature of the present invention, there are provided a method and apparatus that can monitor integrity of data processed in the host system in a SoC environment.

14 Claims, 8 Drawing Sheets

(51) Int. Cl.
G06F 11/30 (2006.01)
G06F 13/16 (2006.01)
G06F 21/79 (2013.01)
H04L 29/06 (2006.01)

(52) U.S. Cl.
CPC .......... *G06F 3/0659* (2013.01); *G06F 3/0673* (2013.01); *G06F 11/30* (2013.01); *G06F 13/16* (2013.01); *G06F 21/79* (2013.01); *H04L 63/145* (2013.01)

(58) Field of Classification Search
USPC .................................. 711/100, 154, 162, 163
See application file for complete search history.

(56) References Cited

U.S. PATENT DOCUMENTS

| | | | |
|---|---|---|---|
| 6,212,635 B1* | 4/2001 | Reardon | G06F 21/34 380/30 |
| 6,986,052 B1* | 1/2006 | Mittal | G06F 12/1441 711/E12.097 |
| 7,979,716 B2* | 7/2011 | Fiske | G06F 21/32 711/164 |
| 2003/0200448 A1 | 10/2003 | Foster et al. | |
| 2005/0182909 A1* | 8/2005 | Volp | G06F 12/1458 711/152 |
| 2008/0104348 A1* | 5/2008 | Kabzinski | G06F 21/78 711/164 |
| 2008/0109903 A1 | 5/2008 | Werner et al. | |
| 2008/0289038 A1 | 11/2008 | Kim et al. | |
| 2009/0217377 A1 | 8/2009 | Arbaugh et al. | |
| 2009/0319741 A1 | 12/2009 | Gremaud et al. | |
| 2009/0327637 A1* | 12/2009 | Chouery | G06F 21/554 711/163 |

\* cited by examiner

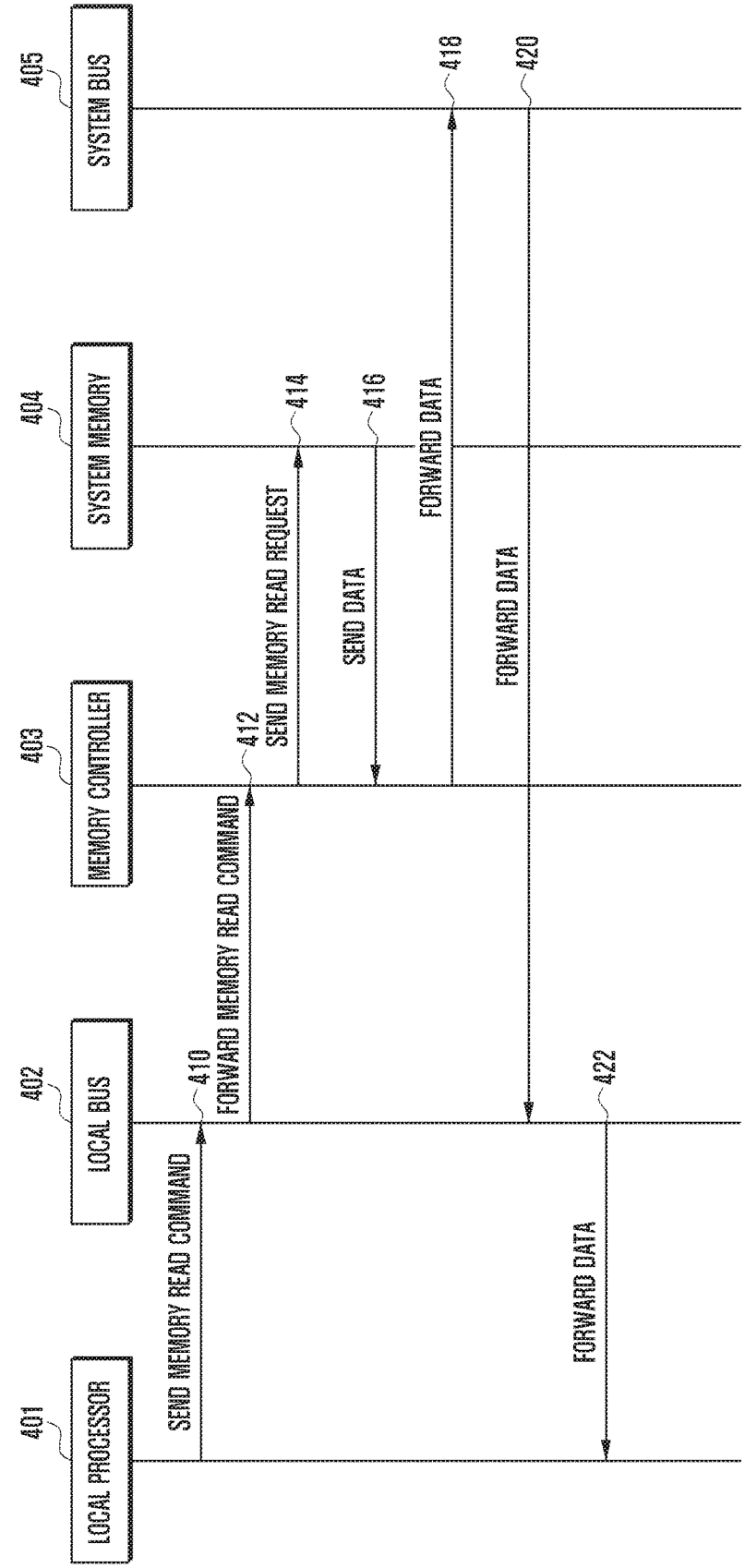

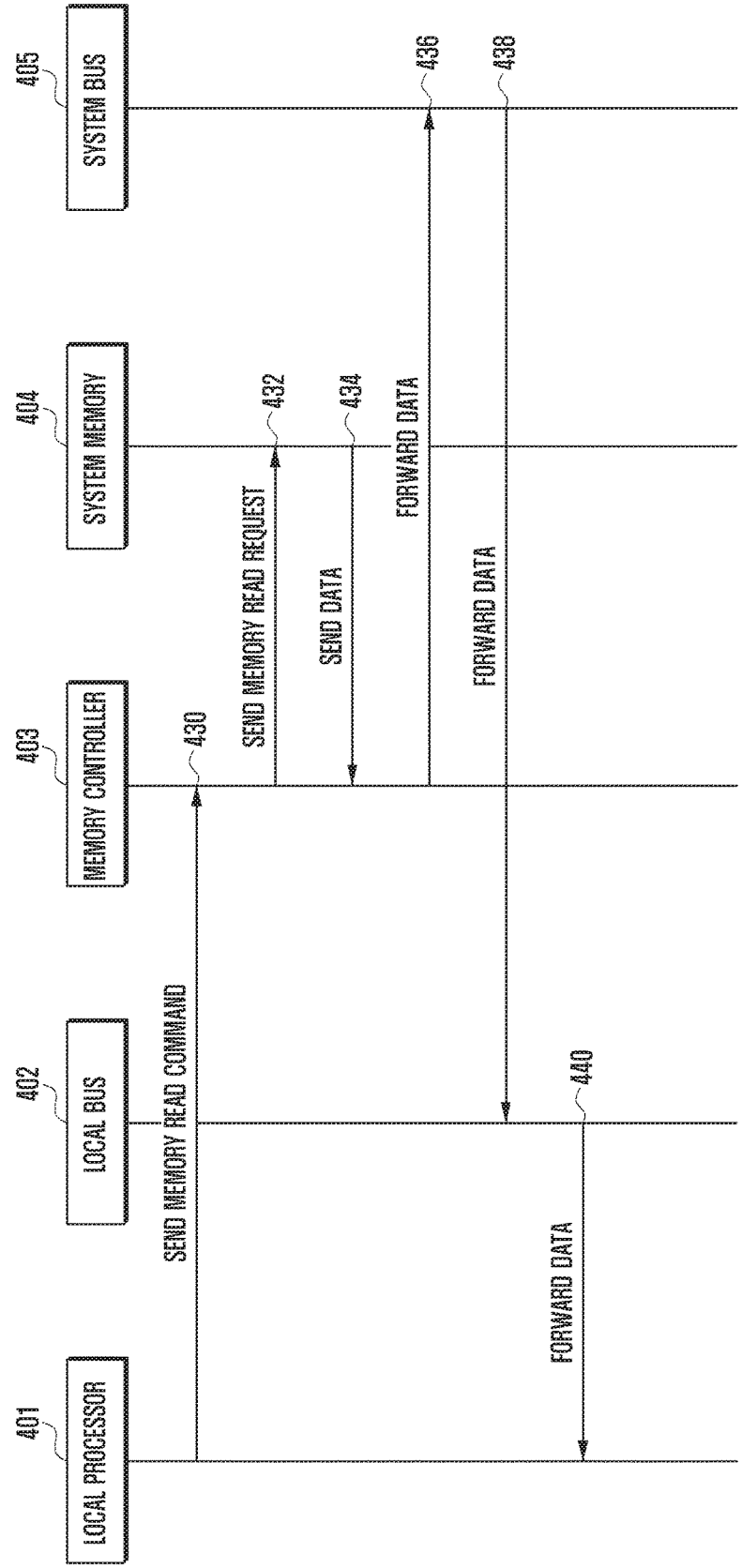

METHOD AND DEVICE FOR MONITORING DATA INTEGRITY IN SHARED MEMORY ENVIRONMENT

TECHNICAL FIELD

The present invention relates to a snooper-based kernel integrity monitoring apparatus and control method therefor. More particularly, the present invention relates to an integrity monitoring apparatus sharing a memory with the main system in a system on chip (SoC) environment and a control method therefor.

BACKGROUND ART

As the number of devices using a system on chip (SoC) increases, it has become necessary to monitor attacks from malicious software during data processing in SoC environments. Particularly in a SoC environment, to examine integrity of processed data and to effectively block attacks from malicious software, it is necessary to efficiently monitor attacks on the operating system (OS) kernel. However, using separate monitoring mechanisms entails addition of a processor and memory unit, causing an increase in the SoC chip area. This may result in an increase in manufacturing costs and power consumption during operation.

DISCLOSURE OF INVENTION

Technical Problem

The present invention has been made in view of the above problems. Accordingly, an aspect of the present invention is to provide an apparatus that can monitor attacks from malicious programs, detect a violation of data integrity, and perform a corresponding response action in a SoC environment, and a control method therefor.

Another aspect of the present invention is to provide a monitoring apparatus that shares a memory with the host system to monitor data integrity in a SoC environment in such a manner as to reduce the system area and power consumption, and a control method therefor.

Solution to Problem

In accordance with an aspect of the present invention, there is provided a method of memory access for a memory controller in an integrity monitoring system sharing memory with a host system. The memory access method may include: receiving a memory access command from a local processor of the integrity monitoring system; accessing a system memory of the host system according to the memory access command; receiving data corresponding to the memory access command from the host system; and forwarding the received data to the local processor. Here, the system memory may include a secure area, access to which is allowed when the memory controller receives a memory access command from the local processor.

In accordance with another aspect of the present invention, there is provided an apparatus for an integrity monitoring system sharing memory with a host system. The apparatus may include: a local processor to control operation of the integrity monitoring system; and a memory controller to perform a process of receiving a memory access command from the local processor, accessing a system memory of the host system according to the memory access command, receiving data corresponding to the memory access command from the host system, and forwarding the received data to the local processor, wherein the system memory includes a secure area, access to which is allowed when the memory controller receives a memory access command from the local processor.

Advantageous Effects of Invention

In a feature of the present invention, there are provided a method and apparatus that can monitor integrity of data processed in the host system in a SoC environment.

In another feature of the present invention, there is provided a method that enables an apparatus monitoring data integrity in the host system to share a memory with the host system in such a manner as to efficiently use the system area and reduce power consumption.

In another feature of the present invention, the integrity monitoring apparatus is equipped with a controller for memory read and write for memory sharing with the host system, heightening monitoring reliability.

BRIEF DESCRIPTION OF DRAWINGS

FIG. 4A to 4C illustrate a flow of signals between components according to various embodiments of the present invention.

MODE FOR THE INVENTION

Figure 1:
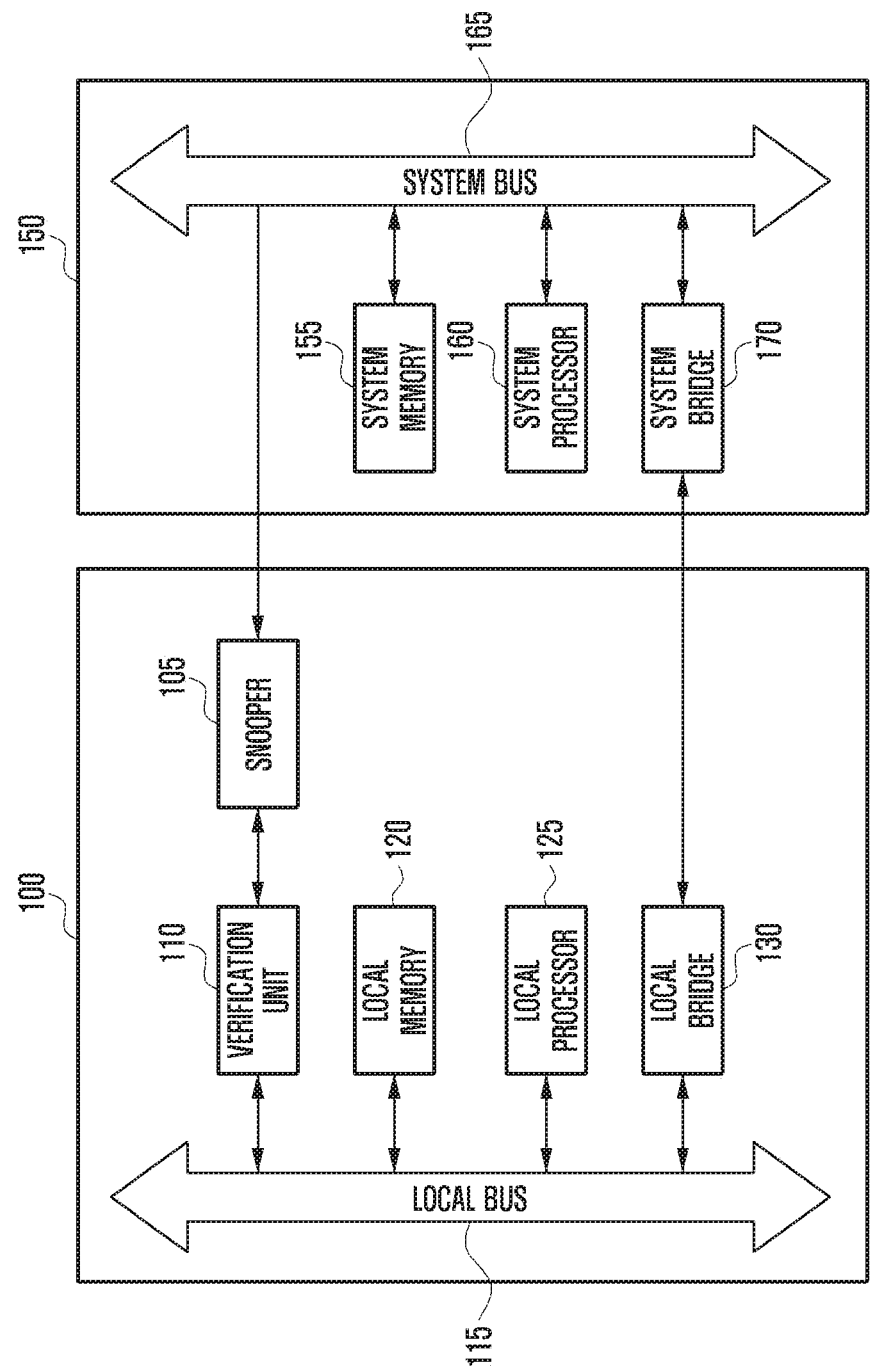
FIG. 1 is a block diagram of the system according to an embodiment of the present invention.

Hereinafter, embodiments of the present invention are described in detail with reference to the accompanying drawings.

Detailed descriptions of well-known functions and structures incorporated herein may be omitted to avoid obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Next, a description is given of a method and apparatus for monitoring data integrity in a shared memory environment as embodiments of the present invention with reference to the drawings.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

FIG. 1 is a block diagram of the system according to an embodiment of the present invention.

Referring to FIG. 1, the system of the present invention may include a host system 150 to perform computation and transceive signals, and an integrity monitoring system 100 to monitor integrity of signals transceived by the host system 150.

The integrity monitoring system 100 and the host system 150 may be implemented together on the same chip or may be interconnected through a separate connection structure according to embodiments.

In one embodiment, the integrity monitoring system 100 may include one or more of a snooper 105, a verification unit 110, a local bus 115, a local memory 120, a local processor 125, and a local bridge 130.

The snooper 105 may be connected with a system bus 165, and may monitor data passing through the system bus 165 by use of snooping.

The verification unit 110 may verify traffic snooped by the snooper 105 to detect a breach of integrity owing to an attack from malicious software or the like. The verification unit 110 may use the local bus 115 to send and receive data to and from other components of the integrity monitoring system 100.

The local memory 120 may store data needed for operation of the integrity monitoring system 100 and integrity check results. The local memory 120 may use the local bus 115 to send and receive data to and from other components of the integrity monitoring system 100.

The local processor 125 may act as a controller controlling the overall operation of the integrity monitoring system 100. The local processor 125 may use the local bus 115 to send and receive data to and from other components of the integrity monitoring system 100.

The local bridge 130 may use the local bus 115 to send and receive data to and from other components of the integrity monitoring system 100, and may act as a connection interface to exchange signals with an external system. In particular, the local bridge 130 may be connected with a system bridge 170 of the host system 150 for signal exchange.

The host system 150 may include one or more of a system memory 155, a system processor 160, a system bus 165, and a system bridge 170.

The system memory 155 may store data needed for operation of the host system 150, and the stored data may be read under the control of the system processor 160. The system memory 155 may use the system bus 165 to send and receive data to and from other components of the host system 150.

The system processor 160 may act as a controller controlling the overall operation of the host system 150. The system processor 160 may use the system bus 165 to send and receive data to and from other components of the host system 150.

The system bridge 170 may use the system bus 165 to send and receive data to and from other components of the host system 150, and may act as a connection interface to exchange signals with an external system. In particular, the system bridge 170 may be connected with the local bridge 130 of the integrity monitoring system 100 for signal exchange.

In one embodiment, the integrity monitoring system 100 may monitor traffic generated by the host system 150 to examine integrity of data in the traffic. Specifically, the integrity monitoring system 100 may monitor traffic on the system bus 165 of the host system 150 by use of the snooper 105. The snooper 105 may monitor traffic passing through the system bus 165 by use of snooping.

When a violation of integrity is detected in traffic data, the integrity monitoring system 100 may notify the host system 150 of the integrity violation. Specifically, the integrity monitoring system 100 may notify the system processor 160 of the integrity violation via the local bridge 130 and the system bridge 170. In response, the system processor 160 may handle (e.g. reprocess) the data whose integrity is violated. As such, the integrity monitoring system 100 monitoring integrity of traffic on the system bus 165 may increase operational reliability.

Here, the local bridge 130 may be optional, and the system bridge 170 may be directly connected with the local bus 115.

Figure 2:
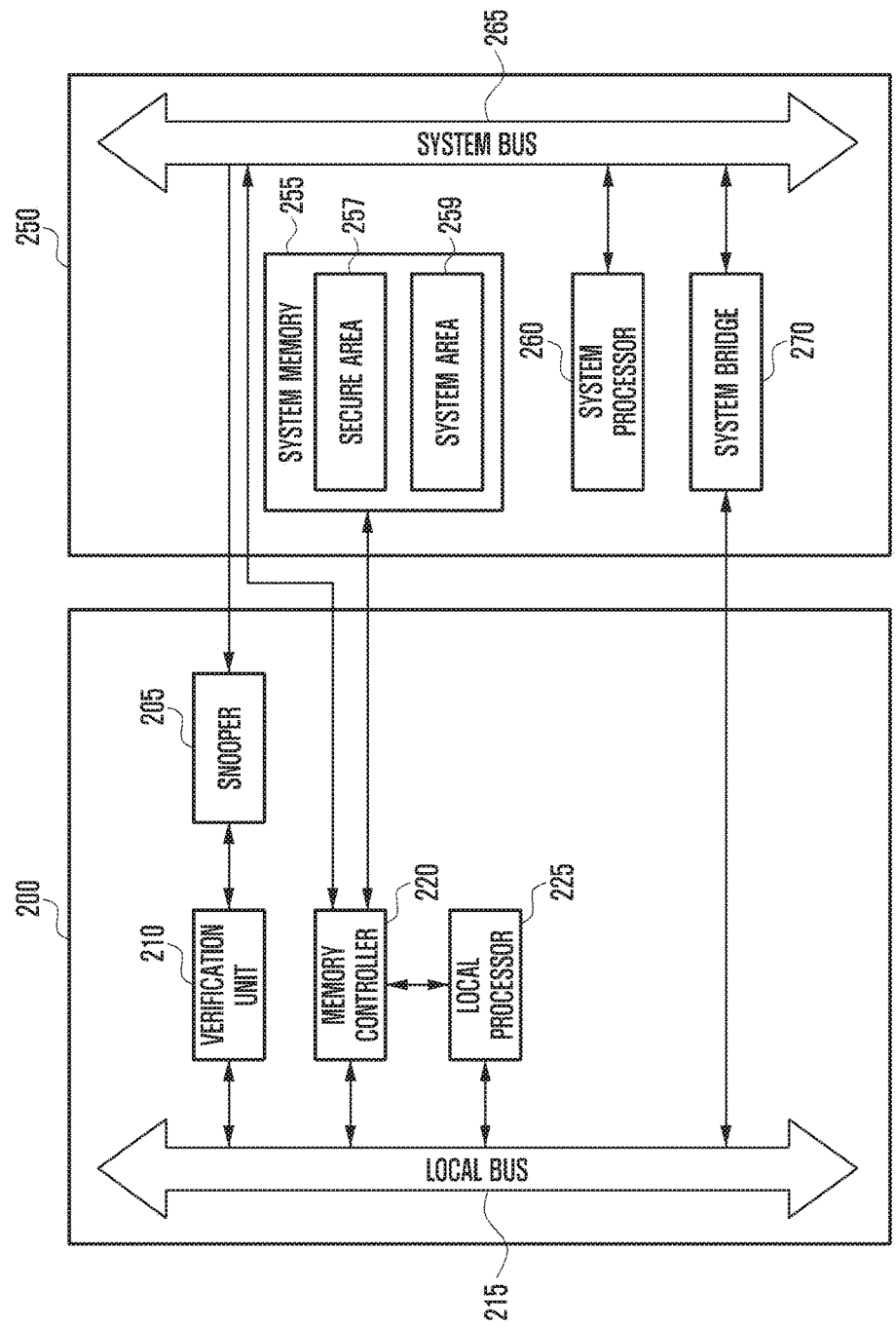
FIG. 2 is a block diagram of the system according to another embodiment of the present invention.

FIG. 2 is a block diagram of the system according to another embodiment of the present invention.

Referring to FIG. 2, the integrity monitoring system 200 and the host system 250 may be implemented together on the same chip or may be interconnected through a separate connection structure according to embodiments. In the embodiment of FIG. 2, the integrity monitoring system 200 shares a region of the system memory 255 of the host system 250, and may further include a memory controller 220 for such memory sharing.

In one embodiment, the integrity monitoring system 200 may include one or more of a snooper 205, a verification unit 210, a local bus 215, a memory controller 220, and a local processor 225.

The host system 250 may include one or more of a system memory 255, a system processor 260, a system bus 265, and a system bridge 270.

The snooper 205 may be connected with the system bus 265, and may monitor data passing through the system bus 265 by use of snooping.

The verification unit 210 may verify traffic snooped by the snooper 205 to detect a breach of integrity owing to an attack from malicious software or the like. The verification unit 210 may use the local bus 215 to send and receive data to and from other components of the integrity monitoring system 200.

The memory controller 220 is a module enabling the integrity monitoring system 200 to share the system memory 255 of the host system 250. Specifically, the memory controller 220 may access the system memory 255 for read and write according to control signals from the local processor 225 and the system processor 260. The memory controller 220 may be connected with one or more of the local bus 215, the local processor 225, the system memory 255, and the system bus 265. One or more of the connections may be optional. The memory controller 220 and connections thereof are described in more detail later.

The local processor 225 may act as a controller controlling the overall operation of the integrity monitoring system 200. The local processor 225 may use the local bus 215 to send and receive data to and from other components of the integrity monitoring system 200. The local processor 225 may control the memory controller 220 to read data stored in the system memory 255. Specifically, the memory controller 220 may read data stored in the system memory 255 and forward the data to the local processor 225 via the system bus 265, the system bridge 270 and the local bus 215. Here, the system bridge 270 may be an optional element. In another embodiment, a local bridge may be added between the local bus 215 and the system bridge 270.

The host system 250 may include one or more of a system memory 255, a system processor 260, a system bus 265, and a system bridge 270.

The system memory 255 may include a secure area 257 and a system area 259, and each of the secure area 257 and the system area 259 may store programs and/or data.

The secure area 257 may store programs and/or data related to the integrity monitoring system 200. The system memory 255 may be accessed through the memory controller 220, and the secure area 257 may be accessed through the memory controller 220 only in relation to operations of the integrity monitoring system 200. This may ensure kernel independence of the integrity monitoring system 200 in a shared memory environment.

The system area 259 may be accessed by the host system 250 through the memory controller 220. The system area 259 may store programs and/or data related to the host system 250. When the memory controller 220 accesses the system memory 255 in response to a request from the host system 250, it is not allowed to access the secure area 257, ensuring kernel independence.

The local processor 225 may access the secure area 257 for setting and modification only through the memory controller 220, and the system processor 260 is not allowed to access the secure area 257.

In another embodiment, the snooper 205 may investigate information of the system bus 265. The verification unit 210 may store the address of the secure area 257. When an attack on the secure area 257 is detected, the verification unit 210 may request the local processor 225 to analyze the attack and notify the system processor 260 of the analysis result.

In another embodiment, the system processor 260 may allocate the secure area 257 to the integrity monitoring system 200, and the roles of the memory controller 220, the verification unit 210 and the local processor 225 may be determined according to the allocation information.

The system processor 260 may act as a controller controlling the overall operation of the host system 250. The system processor 260 may use the system bus 265 to send and receive data to and from other components of the host system 250. In one embodiment, the system processor 260 may control the overall operation of the host system 250 except for the secure area 257.

The system bridge 270 may use the system bus 265 to send and receive data to and from other components of the host system 250, and may act as a connection interface to exchange signals with an external system. In particular, the system bridge 170 may be connected with the integrity monitoring system 200 for signal exchange.

In one embodiment, the integrity monitoring system 200 may monitor traffic generated by the host system 250 to examine integrity of data in the traffic. Specifically, the integrity monitoring system 200 may monitor traffic on the system bus 265 of the host system 250 by use of the snooper 205. The snooper 205 may monitor traffic passing through the system bus 265 by use of snooping.

When a violation of integrity is detected in traffic data, the integrity monitoring system 200 may notify the host system 250 of the integrity violation. As such, the integrity monitoring system 200 monitoring integrity of traffic on the system bus 265 may increase operational reliability. The configuration and connections of the memory controller 220 are described in more detail later.

Although the memory controller 220 is described as belonging to the integrity monitoring system 200, it may belong to the host system 250 according to embodiments.

In one embodiment, the integrity monitoring system 200 may be connected with the host system 250 for operation. In this case, the integrity monitoring system 200 may control the system memory 255 so that the system memory 255 and the system bus 265 are not connected.

Figure 3A:
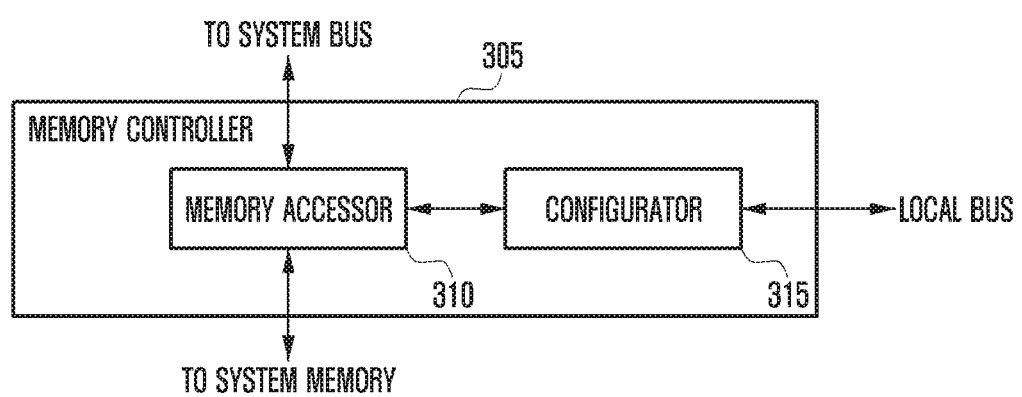
FIG. 3A to 3C illustrate connections of the memory controller according to various embodiments of the present invention.
Figure 3B:
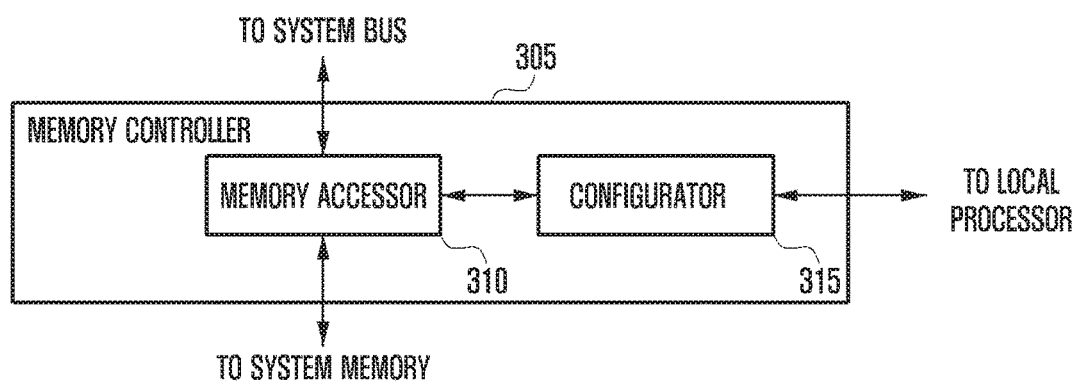
Figure 3C:
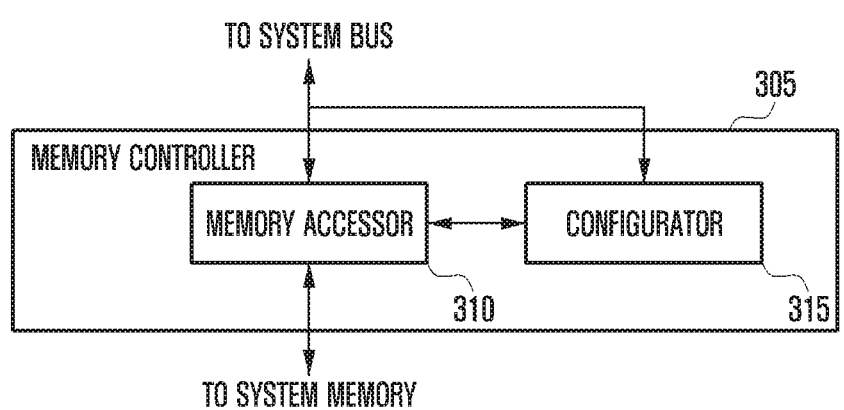

FIG. 3A to 3C illustrate connections of the memory controller according to various embodiments of the present invention.

Referring to FIG. 3A, the memory controller 305 of the integrity monitoring system may include a memory accessor 310 and a configurator 315.

The memory accessor 310 may be connected with the system memory and the system bus. According to a control command input to the configurator 315, the memory accessor 310 may access the system memory for read or write operation. The memory accessor 310 may receive a program and/or data from the system bus and write the same to the system memory, or may read a program and/or data from the system memory and send the same to the system bus.

The configurator 315 may control the operation of the memory accessor 310 on the basis of a received control command. In one embodiment, the configurator 315 may be connected with the local bus of the integrity monitoring system. A control command may be received from the local processor of the integrity monitoring system. Such a control command may be received via the local bus. Specifically, when a read or write command is received via the system bus from the system processor of the host system, the memory accessor 310 may be controlled so as to access the system area of the system memory. When an access command is received from the local processor of the integrity monitoring system, the configurator 315 may control the memory accessor 310 to access the secure area of the system memory on the basis of the access command. A message input to the configurator 315 may be received via the local bus.

Referring to FIG. 3B, the memory controller 305 of the integrity monitoring system may include a memory accessor 310 and a configurator 315.

The memory accessor 310 may be connected with the system memory and the system bus. According to a control command input to the configurator 315, the memory accessor 310 may access the system memory for read or write operation. The memory accessor 310 may receive a program and/or data from the system bus and write the same to the system memory, or may read a program and/or data from the system memory and send the same to the system bus.

The configurator 315 may control the operation of the memory accessor 310 on the basis of a received control command. In one embodiment, the configurator 315 may be connected with the local processor of the integrity monitoring system. A control command may be received from the local processor of the integrity monitoring system. Specifically, when a read or write command is received via the system bus from the system processor of the host system, the memory accessor 310 may be controlled so as to access the system area of the system memory. When an access command is received from the local processor of the integrity monitoring system, the configurator 315 may control the memory accessor 310 to access the secure area of the system memory on the basis of the access command. A message input to the configurator 315 may be received via the local bus.

Referring to FIG. 3C, the memory controller 305 of the integrity monitoring system may include a memory accessor 310 and a configurator 315.

The memory accessor 310 may be connected with the system memory and the system bus. According to a control command input to the configurator 315, the memory accessor 310 may access the system memory for read or write operation. The memory accessor 310 may receive a program and/or data from the system bus and write the same to the system memory, or may read a program and/or data from the system memory and send the same to the system bus.

The configurator 315 may control the operation of the memory accessor 310 on the basis of a received control command. In one embodiment, the configurator 315 may be connected with the system bus of the host system. Specifically, the local processor may be connected with the system bus via the local bus, and may send a control command to the configurator 315 via the system bus. A control command may be received from the local processor of the integrity monitoring system. Specifically, when a read or write command is received via the system bus from the system processor of the host system, the memory accessor 310 may be controlled so as to access the system area of the system memory. When an access command is received from the local processor of the integrity monitoring system, the configurator 315 may control the memory accessor 310 to access the secure area of the system memory on the basis of the access command. A message input to the configurator 315 may be received via the local bus.

In one embodiment, the configurator 315 may determine the scheme whereby the memory accessor 310 is connected to the system memory according to a control command from the local processor. Only the integrity monitoring system is allowed to access the secure area of the system memory while preventing other devices from accessing the secure area, ensuring independence of the integrity monitoring system.

Figure 4C:
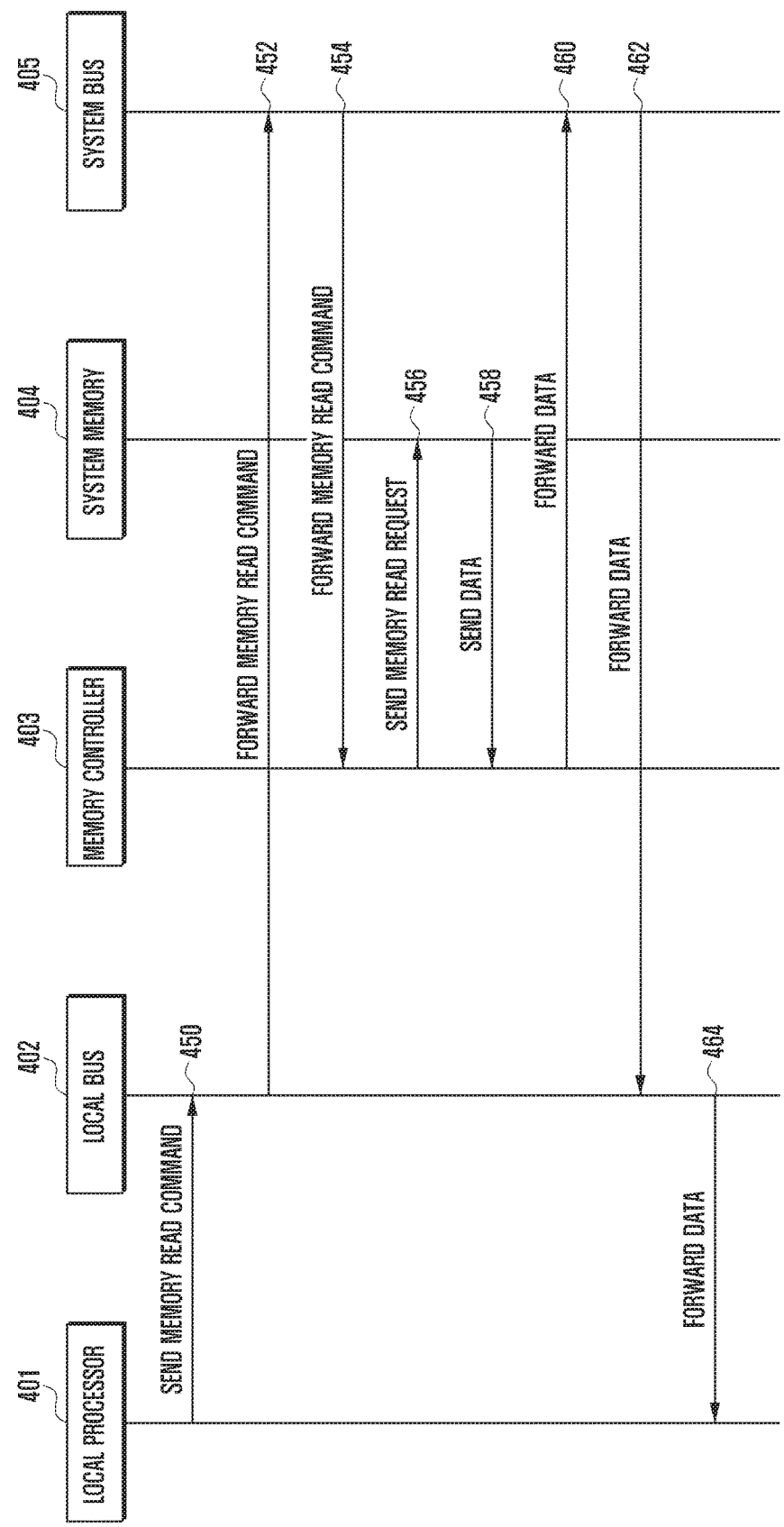

FIG. 4A to 4C illustrate a flow of signals between components according to various embodiments of the present invention. Here, signals may be sent and received between one or more entities among the local processor 401, the local bus 402, the memory controller 403, the system memory 404, and the system bus 405. The following description focuses on the signal flow for a read command. However, a write command may also be processed in a similar manner.

FIG. 4A illustrates signal transmission and reception for the system configuration depicted in FIG. 3A.

Referring to FIG. 4A, at step 410, the local processor 401 sends a memory read command to the local bus 402.

At step 412, the local bus 402 forwards the memory read command to the memory controller 403.

At step 414, the memory controller 403 sends a memory read request for the area corresponding to the received memory read command to the system memory 404. Here, the area corresponding to the memory read command may be the secure area of the system memory 404, which is accessible to the local processor 401. Access to the secure area is allowed according to a read command from the local processor 401 under the control of the memory controller 403.

At step 416, the system memory 404 sends stored data corresponding to the memory read request to the memory controller 403.

At step 418, the memory controller 403 forwards the received data to the system bus 405.

At step 420, the system bus 405 forwards the received data to the local bus 402.

At step 422, the local bus 402 forwards the received data to the local processor 401.

As such, the local processor 401 may access a corresponding area of the system memory 404 shared with the host system under the control of the memory controller 403, ensuring independence of the integrity monitoring system.

FIG. 4B illustrates signal transmission and reception for the system configuration depicted in FIG. 3B.

Referring to FIG. 4B, at step 430, the local processor 401 issues a memory read command to the memory controller 403.

At step 432, the memory controller 403 sends a memory read request for the area corresponding to the received memory read command to the system memory 404. Here, the area corresponding to the memory read command may be the secure area of the system memory 404, which is accessible to the local processor 401. Access to the secure area is allowed according to a read command from the local processor 401 under the control of the memory controller 403.

At step 434, the system memory 404 sends stored data corresponding to the memory read request to the memory controller 403.

At step 436, the memory controller 403 forwards the received data to the system bus 405.

At step 438, the system bus 405 forwards the received data to the local bus 402.

At step 440, the local bus 402 forwards the received data to the local processor 401.

As such, the local processor 401 may access a corresponding area of the system memory 404 shared with the host system under the control of the memory controller 403, ensuring independence of the integrity monitoring system.

In the present embodiment, the direct connection between the local processor 401 and the memory controller 403 may contribute to more rapid processing.

FIG. 4C illustrates signal transmission and reception for the system configuration depicted in FIG. 3C.

Referring to FIG. 4C, at step 450, the local processor 401 sends a memory read command to the local bus 402.

At step 452, the local bus 402 forwards the memory read command to the system bus 405.

At step 454, the system bus 405 forwards the memory read command to the memory controller 403.

At step 456, the memory controller 403 sends a memory read request for the area corresponding to the received memory read command to the system memory 404. Here, the area corresponding to the memory read command may be the secure area of the system memory 404, which is accessible to the local processor 401. Access to the secure area is allowed according to a read command from the local processor 401 under the control of the memory controller 403.

At step 458, the system memory 404 sends stored data corresponding to the memory read request to the memory controller 403.

At step 460, the memory controller 403 forwards the received data to the system bus 405.

At step 462, the system bus 405 forwards the received data to the local bus 402.

At step 464, the local bus 402 forwards the received data to the local processor 401.

As such, the local processor 401 may access a corresponding area of the system memory 404 shared with the host system under the control of the memory controller 403, ensuring independence of the integrity monitoring system. In the present embodiment, the system bus 405 is used to send a memory read command to the memory controller 403. That is, it is possible to deliver a control command without a direct command interface between the local processor 401 and the memory controller 403. Accordingly, when the memory controller 403 is placed in the host system, the procedure of FIG. 4C may be utilized.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method of memory access for a memory controller in an integrity monitoring system sharing memory with a host system, the method comprising:
receiving, from at least one of a local processor of the integrity monitoring system and a system processor of the host system, a memory access command;
accessing a system memory of the host system based on the memory access command; and
receiving, from the system memory of the host system, data corresponding to the memory access command,
wherein the system memory of the host system includes a secure area, access to which is allowed if the memory access command initiated at the local processor is received, and
wherein, if an access request corresponding to an address of the secure area is received via a system bus, the access request is identified as an unauthorized access and information for the unauthorized access identified by the local processor is transmitted to the system processor.

2. The method of claim 1, further comprising:
forwarding, to the local processor, the received data via at least one of a system bus of the host system and a local bus of the integrity monitoring system, if the memory access command is received from the local processor.

3. The method of claim 1, wherein the memory access command is received from the local processor via a local bus of the integrity monitoring system.

4. The method of claim 1, wherein the memory access command is received from the local processor via an interface directly connected to the local processor.

5. The method of claim 1, wherein the memory access command is received from the system processor via a local bus of the integrity monitoring system and a system bus of the host system.

6. The method of claim 1, wherein the integrity monitoring system comprises a verification unit that monitors data passing via a system bus of the host system by use of snooping.

7. The method of claim 1, wherein the system memory further includes a system area, to which the host system has access.

8. An apparatus for an integrity monitoring system sharing memory with a host system, comprising:
a local processor to control operation of the integrity monitoring system; and
a memory controller configured to:
receive, from at least one of a local processor of the integrity monitoring system and a system processor of the host system, a memory access command from the local processor,
access a system memory of the host system based on the memory access command, and
receive, from the system memory of the host system, data corresponding to the memory access command from the host system,
wherein the system memory of the host system includes a secure area, access to which is allowed if the memory access command initiated at the local processor is received, and
wherein, if an access request corresponding to an address of the secure area is received via a system bus, the access request is identified as an unauthorized access and information for the unauthorized access identified by the local processor is transmitted to the system processor.

9. The apparatus of claim 8, wherein the memory controller is further configured to forward, to the local processor, the received data via at least one of a system bus of the host system and a local bus of the integrity monitoring system, if the memory access command is received from the local processor.

10. The apparatus of claim 8, wherein the memory access command is received from the local processor via a local bus of the integrity monitoring system.

11. The apparatus of claim 8, wherein the memory access command is received from the local processor via an interface directly connected to the local processor.

12. The apparatus of claim 8, wherein the memory access command is received from the system processor via a local bus of the integrity monitoring system and a system bus of the host system.

13. The apparatus of claim 8, further comprising:
a verification unit that monitors data passing via a system bus of the host system by use of snooping.

14. The apparatus of claim 8, wherein the system memory further includes a system area, to which the host system has access.

* * * * *